US012765478B2

(12) United States Patent
Palmroth et al.

(10) Patent No.: US 12,765,478 B2
(45) Date of Patent: Oct. 20, 2026

(54) WORK VEHICLE AND SYSTEM HAVING A HARVESTER TOOL FOR A FORESTRY APPLICATION

(71) Applicant: DEERE & COMPANY, Moline, IL (US)

(72) Inventors: Mikko Palmroth, Tampere (FI); Vesa Siltanen, Tampere (FI); Sami Hörkkö, Tampere (FI)

(73) Assignee: Deere & Company, Moline, IL (US)

( * ) Notice: Subject to any disclaimer, the term of this patent is extended or adjusted under 35 U.S.C. 154(b) by 65 days.

(21) Appl. No.: 19/089,177

(22) Filed: Mar. 25, 2025

(65) Prior Publication Data

US 2025/0301973 A1 Oct. 2, 2025

(30) Foreign Application Priority Data

Mar. 27, 2024 (EP) .................................... 24166929

(51) Int. Cl.
*A01G 23/083* (2006.01)

(52) U.S. Cl.
CPC ................................ *A01G 23/083* (2013.01)

(58) Field of Classification Search
None
See application file for complete search history.

(56) References Cited

U.S. PATENT DOCUMENTS

2020/0181870 A1* 6/2020 Nakano .................... E02F 3/32
2022/0408664 A1 12/2022 Johansson

FOREIGN PATENT DOCUMENTS

| | | | | | |
|---|---|---|---|---|---|
| CA | 1108512 | A | * | 9/1981 | |
| CN | 110221332 | A | * | 9/2019 | ............ G01S 19/40 |
| DE | 19632977 | A1 | * | 2/1998 | .......... A01D 43/085 |
| EP | 2987399 | A1 | | 2/2016 | |
| EP | 3771332 | A1 | | 2/2021 | |
| EP | 3738430 | B1 | | 9/2022 | |
| FR | 2692607 | A1 | * | 12/1993 | ............ E01B 27/08 |
| JP | 3831795 | B2 | * | 10/2006 | |
| JP | 2017099418 | A | * | 6/2017 | |
| JP | 2024114127 | A | * | 8/2024 | |
| WO | WO 2018042080 | A1 | | 3/2018 | |
| WO | WO 2021245335 | A1 | | 12/2021 | |
| WO | WO 2022219242 | A1 | | 10/2022 | |
| WO | WO-2024141708 | A1 | * | 7/2024 | .......... B23D 59/002 |

OTHER PUBLICATIONS

Extended European Search Report and Written Opinion issued in European Patent Application No. 24166929.0 dated Sep. 30, 2024, in 05 pages.

* cited by examiner

*Primary Examiner* — Shelley Chen

(57) ABSTRACT

The disclosed system for a work vehicle is adapted to realize a movement of a boom assembly during a feed process of the work vehicle. The vehicle comprises a boom assembly having a slewing device, a boom tip having a rotator and an extension boom. The boom assembly is adapted to rotate a connected working device around a vertical axis, wherein the working device is a harvester tool. The system controlling the boom assembly comprises movement of the stem through the harvester tool during feeding over the ground and is at least partly compensated by movement of the boom tip, wherein the movement is in a direction of a longitudinal axis of the stem.

11 Claims, 1 Drawing Sheet

WORK VEHICLE AND SYSTEM HAVING A HARVESTER TOOL FOR A FORESTRY APPLICATION

CROSS REFERENCE TO RELATED APPLICATIONS

This application claims priority under 35 U.S.C. § 119 to European patent application EP 24166929.0, filed on 27 Mar. 2024, the disclosure of which is incorporated herein by reference.

FIELD OF THE DISCLOSURE

The present disclosure generally relates to a work vehicle and system for processing a length of material such as a stem, a log, or wood with a harvester tool.

BACKGROUND OF THE DISCLOSURE

Mobile work machines, in particular, work vehicles have an articulated boom and a tree stem processing tool, such as a harvester tool, at the tip of the boom. The harvester tool may operate as a felling head, a harvesting and processing head, or a log grapple equipped with a sawing apparatus in a single tool. This combination of felling, delimbing, feeding, measuring, and cutting makes the harvester tool an efficient and versatile tool in modern forestry operations.

The mobile work machines comprise an articulated boom assembly with the tool attached to a boom tip of the boom assembly. Such tools handle heavy load, that may comprise a load of soil or logs or raw material. Usually, such booms are controlled by hydraulic actuators that are driven by hydraulic pressure from one or more pumps. The pumps are usually powered by the primary power source of the vehicle. The boom assembly usually comprises a slewing device, connected to the chassis of the vehicle and used to turn the boom assembly and to angle the slewing device in a vertical angle to increase the range of the boom assembly. A second boom can be connected to the slewing device by a movable joint and articulated by hydraulic actuators. The second boom enables vertical movement and also increases range of the boom assembly. A third boom can be connected to the second boom by another joint and is articulated by a hydraulic actuator. The third boom can be, i.e. an extension boom, having an extendable boom in a linear movement. At the end of the extension boom is usually provided a boom tip that is used to connect the various working tool, i.e. a harvester tool or a grapple. In order to turn the working tool the boom tip can comprise a rotator, that is hydraulically actuated to move the working tool around a vertical axis.

The stem processing tool or harvester tool comprises several movable knives that are used to grab the log/tree with the harvester tool. These knives are hydraulically actuated and controlled by the controller mounted on the harvester tool. Once the tree is grabbed with the harvester tool, a saw blade, usually at a bottom side of the harvester tool, is activated to cut the tree/stem. After the cutting process the tree will fall over, only being fixated in the harvester tool by the knives closed around the stem. Usually, within the harvester tool, feeding wheels are activated to pull/push the stem through the harvester tool and the knives, so that bark/branches are removed, and the log/stem is cut up into log pieces of determined size. The harvester tool is a power-driven operation where it is manually operated by the operator. The operator maneuver the boom assembly and the harvester tool such that the harvester tool may grasp, move and process an tree stem/log.

During the felling and processing of a tree into logs, the operator extends and maneuvers the boom assembly so that the harvester can close the upper and lower knives around the tree stem.

A harvester tool comprises several movable knives that are used to grab the log/tree with the harvester tool. These knives are hydraulically actuated and controlled by the controller mounted on the harvester tool. Once the tree is grabbed with the harvester tool, a saw blade, usually at a bottom side of the harvester tool, is activated to cut the tree/stem. After the cutting process the tree will fall over, only being fixated in the harvester tool by the knives being closed around the stem. Usually, within the harvester tool, feeding wheels are activated to pull/push the stem through the harvester tool and the knives, so that bark/branches are removed, and the log/stem is cut up into log pieces of determined size.

During the feeding process the boom and the harvester tool are held in a static position or are moved manually being controlled by the operator. When the boom is in static position, the stem must move through the harvester tool while being pulled over the ground and increasing pressure on the contact area between the knives and the stem. This can lead to an opening movement of the upper knives or requires compensation of the closing force, leading to an increase in hydraulic pressure of the hydraulic actuators of the knives. This can lead to increase wear and increased power consumption of the work vehicle.

When the boom is manually moved during the feeding operation, the operator must manually adapt the movement speed and direction to the feeding speed and operate the boom assembly so that the movement is within parameters. If the operator is unable to perform the correct movement, the stem also increases pressure on the knives, leading also to an opening movement of the knives or requiring an increase in the closing force and hydraulic pressure. The felling process is repeated during the felling operation leading to stress and workload of the operator resulting in fatigue and possible performance loss.

Therein lies an opportunity to automate at least a portion of the process to reduce the overall fatigue of the operator by improving the ease of operation while reducing the wear and power consumption of the work vehicle.

SUMMARY OF THE DISCLOSURE

Various aspects of the present disclosure are set out in the claims.

According to a first aspect of the present disclosure, a work vehicle for a forestry application comprises a vehicle frame; a boom assembly rotatably coupled to the vehicle frame; a slewing device for controllably rotating the boom assembly relative to the vehicle frame; a harvester tool rotatably coupled to a boom tip of the boom assembly; and a rotator device for controllably rotating the harvester tool relative to the boom tip. The harvester tool includes a harvester frame having a feed axis, a stem drive system configured to feed a stem along the feed axis, and a pair of upper knives and lower knives movably coupled to the harvester frame. Each pair of upper knives and lower knives are controllable by an actuator to open and close around a stem. A tilt mechanism includes a controllable tilt bracket pivotably attaching the harvester frame to the boom tip, to control a tilt angle of the harvester frame in relation to the bracket. A boom tip sensor outputs boom tip signals indicative of a boom tip position relative to the vehicle frame. A rotator sensor outputs an rotator angle signal indicative of a turning angle of the rotator.

A harvester frame sensor outputs a harvester frame angle signal indicative of the tilt angle of the harvester frame in relation to the bracket. A feeding speed sensor outputs a feeding speed signal indicative of a feeding speed of a stem during operation of the harvester tool controller includes a processor and a memory device coupled to the processor that has instructions stored therein, and wherein the instructions stored in the memory device are executable by the processor to cause the processor to receive the boom tip signal, the rotator angle signal, harvester frame angle signal, and the feeding speed signal; determining a target movement of the boom tip to compensate the feeding speed of the stem based on the boom tip signal, the rotator angle signal, the harvester frame signal and the feeding speed signal wherein the target movement is in a direction along the feed axis; and generate a feed following boom assembly control signal to move one of the slewing device and the rotator to control the boom tip towards the target movement.

The processor may determine a target speed of the boom tip proportional to the feeding speed signal for maintaining a constant boom tip speed movement.

The boom tip signal is indicative of the slewing angle based on the slewing device. The work vehicle processor causes the processor to terminate the target movement of the boom tip when the feed process of a stem ends. The processor may determine a target speed of the boom tip proportional based on a diameter of the stem. The processor may determine the diameter of the stem based on the actuation of the pair of upper knives and lower knives when closed around the stem. The processor may determine a target speed of the boom tip based on a degree of delimbing of the stem. The processor may activate the feed following boom assembly control signal automatically based on one of a tree species, and a tree diameter. The processor may terminate the target movement of the boom tip when the boom tip moved manually in a direction opposite of the feed process along the feed axis. The processor may inhibit activation of the feed following boom assembly control signal if the boom tip is manually maneuvered during the feed process. The processor may terminate the target movement of the boom tip when the feed process of a stem is stuck.

According to another aspect of the present disclosure, a system for a forestry vehicle adapted to realize a movement of a boom assembly during a feed process of the forestry vehicle is shown. The system comprises the boom assembly having a slewing device, a boom tip and an extension boom. The boom tip has a rotator adapted to rotate a connected working device around a vertical axis.

The working device is adapted to be a harvester head. Sensors for the boom assembly detect the position of the boom tip. An angle sensor detects the turning angle of the rotator. A sensor for the harvester head is adapted to detect a feeding speed of a stem in the harvester head during processing.

A CPU receives at least the speed and angle data from the harvester head and the position of the boom tip, processes and calculates a movement of the boom assembly and the boom tip that at least partly compensates the speed of the feed operation of the stem over the ground. The CPU then controls the boom assembly so that the movement of the stem through the harvester head during feeding over the ground is at least partly compensated by movement of the boom tip, wherein the movement is in a direction of a longitudinal axis of the stem.

The sensors are adapted to measure the extension position of hydraulic actuators in the boom assembly.

The sensors are adapted to measure the positions of the individual booms in the boom assembly.

The sensors are adapted to measure the extension of the extension boom and the positions of the individual booms in the boom assembly.

The boom assembly is adapted to comprise a slewing mechanism and the boom assembly having a slewing angle sensor and a turning angle sensor.

The CPU enables a movement speed of the boom tip proportional to the feeding speed or a constant boom tip speed movement.

The CPU automatically stops boom tip movement when the feed process is terminated.

The feeding speed detection is realized depending on a feed control current.

The CPU determines the boom tip movement speed depending on a diameter of the stem and the type of tree.

Other features and aspects will become apparent by consideration of the detailed description and accompanying drawings.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Further embodiments may include any combination of features from one or more dependent claims, and such features may be incorporated, collectively or separately, into any independent claim.

DETAILED DESCRIPTION

The present embodiment concern work vehicle for a forestry application with a harvester tool for felling and processing stems or logs, and method.

Figure 1:
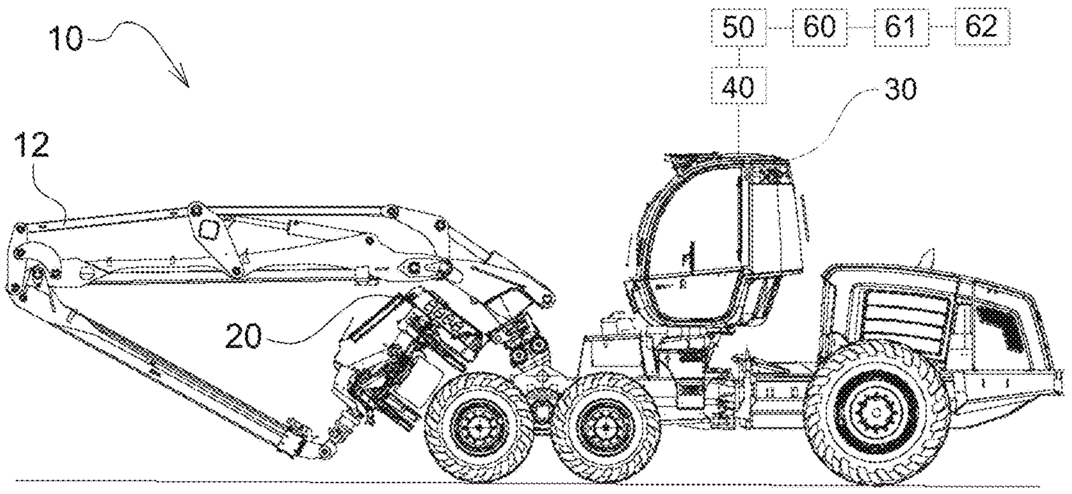
FIG. 1 is a side view of an embodiment of a work vehicle shown as a forest harvester.

FIG. 1 shows a work vehicle 10 for a forestry application. The work vehicle 10 comprises vehicle frame that include an articulating front and rear chassis which are articulated and a driver cabin 30 for the operator. The vehicle 10 has a boom assembly 12 to which a harvester tool 20 is coupled. The boom assembly 12 can rotate and tilt, and thereby extends and rotates the harvester tool 20 by the arrangement of the individual boom assembly components. In the present embodiment, the boom assembly comprises a first boom pivotably coupled to the vehicle frame, a second boom pivotably. A slewing device controllably rotates the boom assembly relative to the vehicle frame, enabling the tilting up and down, and rotation about a vertical oriented axis. The first boom is coupled with a second boom enabling another degree of mobility by turning up and down. The third boom of the boom assembly 12 is an extension boom which is enabled to turn up and down and to extend an inner boom in a linear fashion so that the reach of the boom tip is adaptable.

The boom tip comprises a rotator 78 to which the harvester tool 20 is attached and can be rotated along a vertical axis to face a tree stem.

Figure 2:
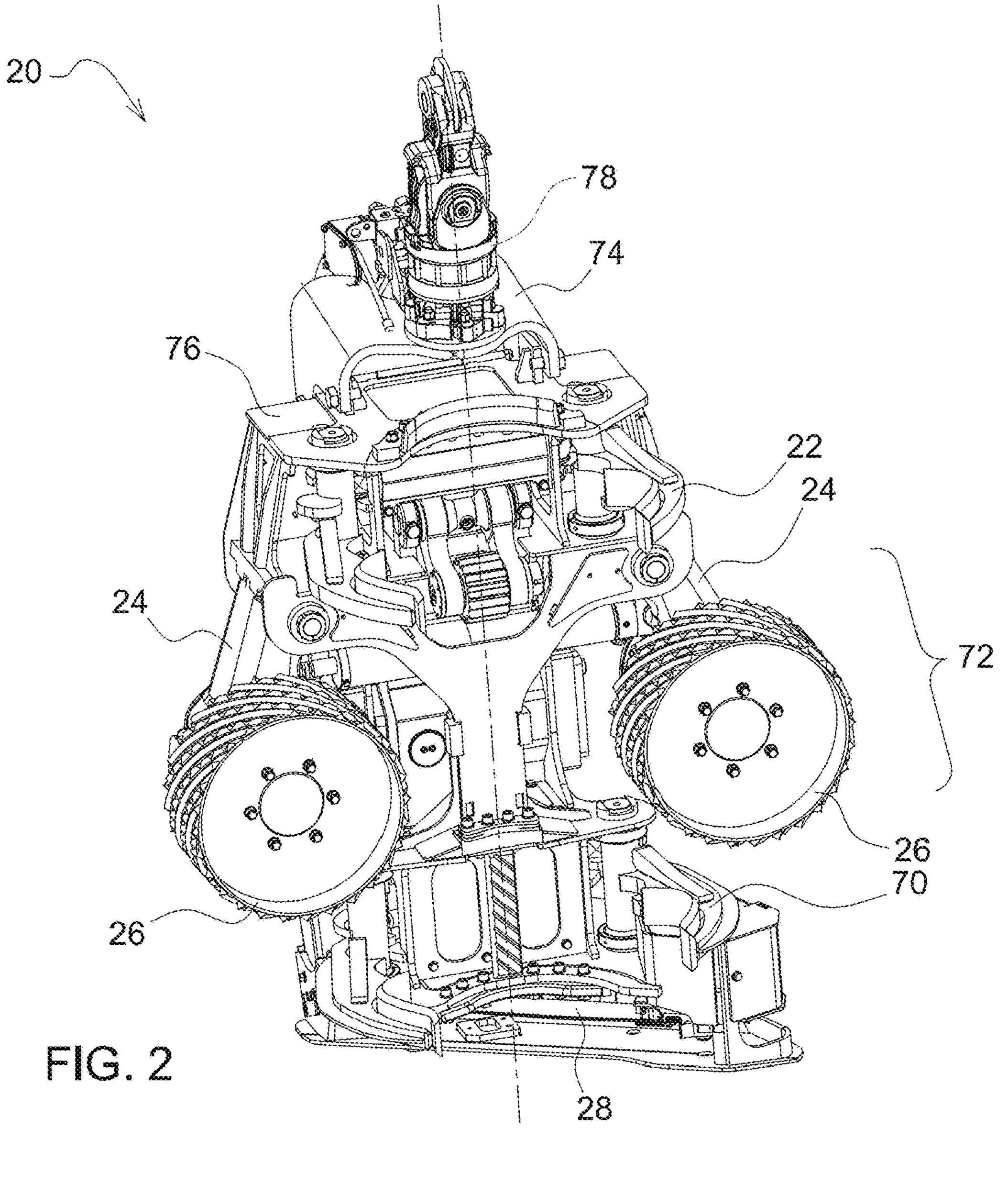
FIG. 2 is an elevated perspective view a tool used with the work vehicle, a harvester tool.

The harvester tool 20, according to the present embodiment, is shown in FIG. 2. It comprises of a harvester frame 76 having a feed axis, a stem drive system configured to feed a stem along the feed axis. The harvester tool further comprises of a pair of upper knives and lower knives which is extending along a feeding axis and a movably fixed tilt bracket 74 which is attachable to the boom assembly 12 of the vehicle 10. The frame 76 contains all necessary parts and devices to ensure the operation of the harvester tool 20, such as controller, hydraulic hubs, hydraulic lines, hydraulic motors, and hydraulic valves. It further comprises movable arms 24 rotatably holding the feeding wheels 26 so that these can be pushed against the stem surface. In a vertical direction, above the feeding wheels 26 are the upper knives 22 and below are the lower knives 70 which are controlled by hydraulic actuators usually but may also be controlled by electric actuators or motors. At the bottom of the frame 76 the saw blade 28 is placed below the lower knives 70.

For the felling and processing of a tree into logs, the operator extends and maneuvers the boom assembly 12 so that the harvester tool 20 can close the upper and lower knives 22, 70 around the tree stem. The operator cuts the tree with the integrated saw 28 felling the tree and holding it at an end with the knives 22, 70 of the harvester tool 20. In a next step the drive system 72, consisting of the feeding arms 24 and the feeding wheels 26, is operated so that the feeding wheels 26 by their gripping surface pull or push the stem through the harvester tool 20 from the upper 22 to the lower knives 70 so that the stem can be cut into logs of predetermined length, controlled by the drive system 72. In parallel the knives cut any branches extending from the stem. The operator uses the tilt bracket 74 which is articulated by a hydraulic actuator to keep the harvester tool in a horizontal orientation so that the knives 22, 70 are extending in a downward direction.

When the feeding wheels 26 transport the stem through the harvester tool 20, the knives 22, 70 need to maintain a close grip to ensure the stem stays within operational parameters and is kept safely inside the harvester tool 20. Also, the knives 22, 70 are used to remove branches and bark from the stem. This leads to the difficulty that a tight grip may remove the branches easily but at the same time increase the friction of the stem and thus increase the workload on the drive system 72 which can lead to damages to the surface and a loss of quality.

The shape of the stem is also an important factor in that a bend or curved shape will require a constant adaption of the grip of the knives 22, 70, leading to a longer processing time and reduced productivity. The grip may also damage the stem and reduce the wood quality. Damaged trees that are felled may undergo further damage during processing as the wood may have cracks in the stem which can further increase during the processing. Broken branches may complicate the processing as the removal by the knives 22, 70 may require more grip force and as stated above may result in more damage to the stem.

When the stem is in a held state inside the knives 22, 70 gravity and weight of the stem and the weight distribution results in different forces on the upper and lower knives 22, 70. At the beginning of the feeding, the stem is mainly extending on the upper side of the harvester tool 20. This results in a force on the upper knives 22 that can result in an opening movement of the upper knives 22. To compensate the forces, the hydraulic force on the hydraulic actuators of the upper knives 22 can be increased. Otherwise, the opening of the knives results in an incomplete shearing of branches and reduced quality of the processed wood. When the stem is further moving through the harvester tool 20 the weight distribution moves to the lower side of the harvester tool, shifting the opening forces to the lower knives 70 with the same effects on the lower knives 70.

During cutting operation, the upper and lower knives 22, 70 are closed around the stem. The harvester tool 20 may only have upper 22 or lower knives 70, this does not change the operation procedure. Further, the harvester tool 20 may have more than two feeding wheels 26, such as four, which does not alter the process or use of this invention.

The system comprises sensors 50, 60, 61, 62 to identify the current state of the boom tip and the orientation or the harvester tool 20. The tilt angle of the slewing mechanism, the angle of the slewing mechanism, the position of all booms of the boom assembly 12 and the angle of the rotator 78 are received by the CPU 40 and the orientation of the stem in the harvester tool 20 is calculated. At the time the operator initiates the felling and the feed procedure the CPU automatically initiates the movement of the boom assembly 12 so that the boom tip and the harvester tool 20 move along the orientation of the lengthwise axis of the stem being processed wherein the movement is in an opposition direction of the feeding movement.

This movement supports a fluent processing of the stem and at the same time minimizes the forces on the knives 22, 70 by using the inertia of the stem to enable a smooth movement of the stem. The movement speed of the boom assembly 12 can be of the same as the feeding speed or less if the movement is oriented in the direction of the stem axis.

The present embodiment may detect the stem size or the tree type. The tree type can also be an input of the operator. Depending on this data the speed of the movement of the boom assembly 12 can be reduced as the inertia of the stem may be increasing with a larger stem. The speed may also be varied as the tree type changes, as different tree types may comprise softer or harder bark or generally develop thicker or thinner branches. This prevents unnecessary wood damage. Various features are set forth the following claims.

What is claimed is:

1. A work vehicle for a forestry application, comprising:
- a vehicle frame;
- a boom assembly rotatably coupled to the vehicle frame;
- a slewing device for controllably rotating the boom assembly relative to the vehicle frame;
- a harvester tool rotatably coupled to a boom tip of the boom assembly;
- a rotator device for controllably rotating the harvester tool relative to the boom tip;
  - the harvester tool including
    - a harvester frame having a feed axis,
    - a stem drive system, configured to feed a stem along the feed axis,
    - a pair of upper knives and lower knives movably coupled to the harvester frame, each pair of upper knives and lower knives controllable by an actuator to open and close around a stem;
    - a tilt mechanism including a controllable tilt bracket pivotably attaching the harvester frame to the boom tip, to control a tilt angle of the harvester frame in relation to the bracket;
- a boom tip sensor to output boom tip signals indicative of a boom tip position relative to the vehicle frame;
- an rotator sensor to output an rotator angle signal indicative of a turning angle of the rotator;

a harvester frame sensor to output a harvester frame angle signal indicative of the tilt angle of the harvester frame in relation to the bracket;

a feeding speed sensor to output a feeding speed signal indicative of a feeding speed of a stem during operation of the harvester tool; and a controller includes a processor and a memory device coupled to the processor that has instructions stored therein, and wherein the instructions stored in the memory device are executable by the processor to cause the processor to receiving the boom tip signal, the rotator angle signal, harvester frame angle signal, and the feeding speed signal;

determining a target movement of the boom tip to compensate the feeding speed of the stem based on the boom tip signal, the rotator angle signal, the harvester frame signal and the feeding speed signal wherein the target movement is in a direction along the feed axis; and generate a feed following boom assembly control signal to move one of the slewing device and the rotator to control the boom tip towards the target movement.

2. The work vehicle of claim 1, wherein the instructions stored in the memory device are executable by the processor to cause the processor to:

determine a target speed of the boom tip proportional to the feeding speed signal for maintaining a constant boom tip speed movement.

3. The work vehicle of claim 1 wherein the boom tip signal is indicative of the slewing angle based on the slewing device.

4. The work vehicle of claim 1, wherein the instructions stored in the memory device are executable by the processor to cause the processor to:

terminate the target movement of the boom tip when the feed process of a stem ends.

5. The work vehicle of claim 1, wherein the instructions stored in the memory device are executable by the processor to cause the processor to:

determine a target speed of the boom tip proportional based on a diameter of the stem.

6. The work vehicle of claim 1, wherein the instructions stored in the memory device are executable by the processor to determine the diameter of the stem based on the actuation of the pair of upper knives and lower knives when closed around the stem.

7. The work vehicle of claim 1, wherein the instructions stored in the memory device are executable by the processor to cause the processor to:

determine a target speed of the boom tip based on a degree of delimbing of the stem.

8. The work vehicle of claim 1, wherein the instructions stored in the memory device are executable by the processor to cause the processor to activate the feed following boom assembly control signal automatically based on one of a tree species, and a tree diameter.

9. The work vehicle of claim 1, wherein the instructions stored in the memory device are executable by the processor to cause the processor to terminate the target movement of the boom tip when the boom tip moved manually in a direction opposite of the feed process along the feed axis.

10. The work vehicle of claim 1, wherein the instructions stored in the memory device are executable by the processor to cause the processor to inhibit activation of the feed following boom assembly control signal if the boom tip is manually maneuvered during the feed process.

11. The work vehicle of claim 1, wherein the instructions stored in the memory device are executable by the processor to cause the processor to:

terminate the target movement of the boom tip when the feed process of a stem is stuck.

* * * * *